United States Patent
Ohkawa

(10) Patent No.: US 8,699,047 B2
(45) Date of Patent: Apr. 15, 2014

(54) IMAGE PROCESSING APPARATUS, IMAGE PROCESSING METHOD, AND NON-TRANSITORY COMPUTER READABLE MEDIUM THAT INCLUDES PLURAL PAGE DESCRIPTION LANGUAGE (PDL) PROCESSING UNITS AND A JOB MANAGEMENT UNIT

(75) Inventor: Kazuhiro Ohkawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 138 days.

(21) Appl. No.: 13/474,316

(22) Filed: May 17, 2012

(65) Prior Publication Data
US 2013/0070292 A1  Mar. 21, 2013

(30) Foreign Application Priority Data

Sep. 15, 2011 (JP) ................................ 2011-201547

(51) Int. Cl.
*G06F 3/12* (2006.01)
(52) U.S. Cl.
USPC ........................ 358/1.13; 358/1.14; 358/1.15
(58) Field of Classification Search
USPC ....................... 358/1.13, 1.14, 1.15
See application file for complete search history.

(56) References Cited

U.S. PATENT DOCUMENTS

| | | | |
|---|---|---|---|
| 2008/0137135 A1* | 6/2008 | Takeishi | 358/1.15 |
| 2009/0002756 A1 | 1/2009 | Mori | |
| 2010/0123726 A1* | 5/2010 | Ito | 358/1.15 |

FOREIGN PATENT DOCUMENTS

| | | | |
|---|---|---|---|
| JP | 10-240467 A | 9/1998 |
| JP | 2006-67587 A | 3/2006 |
| JP | 2009-9378 A | 1/2009 |
| JP | 2010-49405 A | 3/2010 |

* cited by examiner

*Primary Examiner* — Benny Q Tieu
*Assistant Examiner* — Juan M Guillermety
(74) *Attorney, Agent, or Firm* — Sughrue Mion, PLLC

(57) ABSTRACT

An image processing apparatus includes plural page description language processing units and a job management unit. Each of the page description language processing units corresponds to one of different page description languages. The job management unit performs management to select one of the page description language processing units, the selected page description language processing unit serving as a currently processing page description language processing unit, and to cause only the currently processing page description language processing unit to process a print job. Each of the page description language processing units includes a raster image creating unit and a raster image transferring unit. The job management unit includes a first queue, a second queue, a reception-time adding unit, an image-creation-time adding unit, a first instruction unit, a second instruction unit, a third instruction unit, a controller, and a job-being-processed list memory.

3 Claims, 10 Drawing Sheets

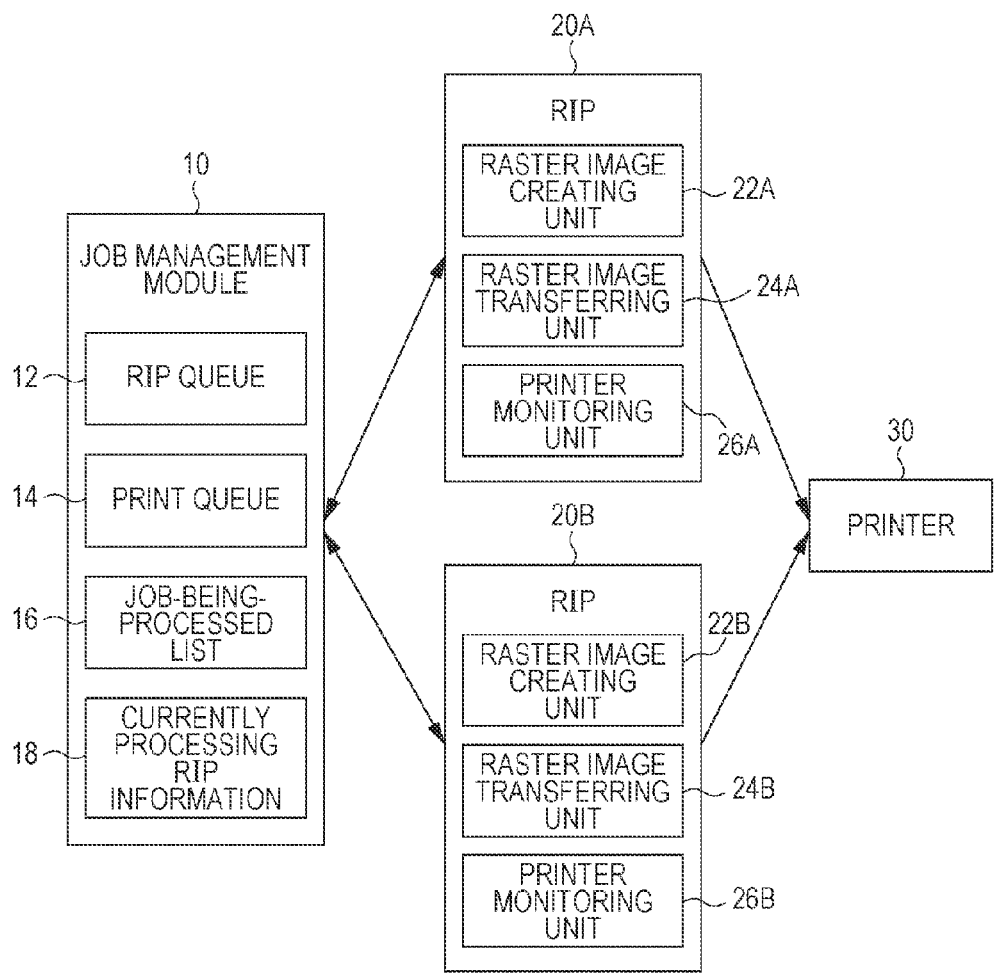

IMAGE PROCESSING APPARATUS, IMAGE PROCESSING METHOD, AND NON-TRANSITORY COMPUTER READABLE MEDIUM THAT INCLUDES PLURAL PAGE DESCRIPTION LANGUAGE (PDL) PROCESSING UNITS AND A JOB MANAGEMENT UNIT

CROSS-REFERENCE TO RELATED APPLICATIONS

This application is based on and claims priority under 35 USC 119 from Japanese Patent Application No. 2011-201547 filed Sep. 15, 2011.

BACKGROUND (i) Technical Field

The present invention relates to an image processing apparatus, an image processing method, and a computer readable medium.

(ii) Related Art

Apparatuses such as a print controller, a print server, and a printer (hereinafter referred to as a "print controller or the like"), are provided with a processing module called a raster image processor (RIP), in order to be capable of interpreting print data that is transmitted from a client computer and that is described in a page description language (PDL) and generating raster image data. Hereinafter, a process of interpreting print data and generating a raster image (rasterization) executed by a RIP will be referred to as a RIP process.

A portable document format (PDF), which has been widely used in recent years, is a file format suitable for viewing data. PDF data may be directly input to a printer and printed out, and is thus regarded as a kind of PDL. In the related art, upon PDF data being input, a RIP for PostScript (registered trademark) language provided in a print controller or the like receives the PDF data, converts the PDF data into data of the PostScript language, and executes a RIP process on the converted data. Thus, it takes a longer time to execute a RIP process on PDF data than on PostScript data.

In recent years, a RIP for directly interpreting and rasterizing PDF data has been developed to process PDF data at a higher speed. Such a RIP has a function of receiving PostScript data, converting the PostScript data into PDF data, and executing a RIP process thereon. In such a RIP, it takes a longer time to execute a RIP process on PostScript data than on PDF data.

In order to process both PostScript data and PDF data at high speed, both a RIP for PostScript data and a RIP for PDF data may be mounted in a print controller or the like. However, a very large memory region is necessary for a RIP process, and thus the print controller or the like may be incapable of executing both RIP processes due to the limited capacity of a memory mounted therein.

SUMMARY

According to an aspect of the invention, there is provided an image processing apparatus including plural page description language processing units and a job management unit. Each of the plural page description language processing units corresponds to one of different page description languages. The job management unit performs management to select one of the plural page description language processing units, the selected page description language processing unit serving as a currently processing page description language processing unit, and to cause only the currently processing page description language processing unit to process a print job. Each of the plural page description language processing units includes a raster image creating unit and a raster image transferring unit. The raster image creating unit interprets a print job described in one of the page description languages corresponding to the page description language processing unit, and creates a raster image. The raster image transferring unit transfers the raster image created by the raster image creating unit to a printer so that the raster image is printed by the printer. The job management unit includes a first queue, a second queue, a reception-time adding unit, an image-creation-time adding unit, a first instruction unit, a second instruction unit, a third instruction unit, a controller, and a job-being-processed list memory. The first queue serves as a queue for a print job for which a raster image has not been created. The second queue serves as a queue for a print job for which a raster image has been created. Upon receiving a printing execution instruction including a print job and specification information specifying one of the plural page description language processing units that is to process the print job, the reception-time adding unit adds the print job to an end of the first queue in association with the specification information and instructs the raster image creating unit of the page description language processing unit specified by the specification information to start processing if a raster image of the print job has not been created, and adds the print job to an end of the second queue in association with the specification information and instructs the raster image transferring unit of the page description language processing unit specified by the specification information to start processing if the raster image of the print job has been created. Upon a raster image of a print job being created by the raster image creating unit of the currently processing page description language processing unit, the image-creation-time adding unit adds the print job to the second queue and instructs the raster image transferring unit of the currently processing page description language processing unit to start processing. If both the page description language processing unit specified by the specification information associated with a print job at the top of the first queue and the page description language processing unit specified by the specification information associated with a print job at the top of the second queue do not match the currently processing page description language processing unit in a state where both the raster image creating unit and the raster image transferring unit of the currently processing page description language processing unit are not processing a print job, the first instruction unit selects the page description language processing unit specified by the specification information associated with the print job at the top of the first queue or the second queue, the selected page description language processing unit serving as a new currently processing page description language processing unit, and instructs the new currently processing page description language processing unit to start processing. If the page description language processing unit specified by the specification information associated with the print job at the top of the first queue matches the currently processing page description language processing unit in a state where both the raster image creating unit and the raster image transferring unit of the currently processing page description language processing unit are not processing a print job, the second instruction unit selects the page description language processing unit specified by the specification information, the selected page description language processing unit continuing to serve as the currently processing page description language processing unit, and instructs the raster image creating unit of the currently processing page description language processing unit to start processing. If the page description language processing unit specified by the specification information associated with the print job at the top of the second queue matches the currently processing page description language processing unit in a state where both the raster image creating unit and the raster image transferring unit of the currently processing page description language processing unit are not processing a print job, the third instruction unit selects the page description language processing unit specified by the specification information, the selected page description language processing unit continuing to serve as the currently processing page description language processing unit, and instructs the raster image transferring unit of the currently processing page description language processing unit to start processing. The controller performs control of examining the specification information associated with the print job at the top of the first queue every time the raster image creating unit finishes processing a print job, causing the raster image creating unit to process the print job at the top of the first queue if the page description language processing unit specified by the specification information matches a current currently processing page description language processing unit, examining the specification information associated with the print job at the top of the second queue every time the raster image transferring unit finishes processing a print job, and causing the raster image transferring unit to process the print job at the top of the second queue if the page description language processing unit specified by the specification information matches a current currently processing page description language processing unit. The job-being-processed list memory stores a list of one or more print jobs that are being processed by the raster image creating unit or the raster image transferring unit of the currently processing page description language processing unit and that have not yet been printed by the printer. The image-creation-time adding unit adds the print job to the second queue by inserting the print job between a first print job that is not stored in the job-being-processed list memory with respect to the print job at the top of the second queue, and a print job immediately before the first print job.

BRIEF DESCRIPTION OF THE DRAWINGS

An exemplary embodiment of the present invention will be described in detail based on the following figures, wherein:

FIG. 1 is a diagram illustrating an example of a system configuration according to an exemplary embodiment of the present invention;

FIG. 2 is a diagram illustrating an example of data content in a queue;

DETAILED DESCRIPTION

Figure 3:
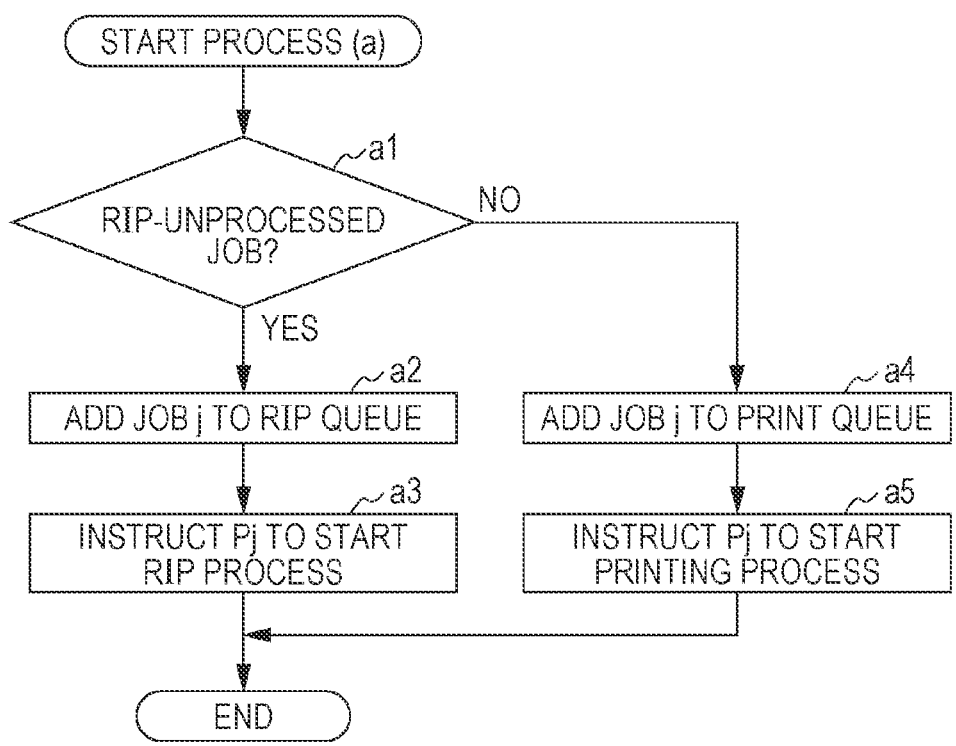
FIG. 3 is a diagram illustrating an example of a procedure of process (a) executed by a job management module.

An example configuration of a print processing system according to an exemplary embodiment of the present invention will be described with reference to FIG. 1. The print processing system processes a print job that is input from a client computer (not illustrated), thereby printing an image corresponding to the print job onto a sheet, for example. Also, the print processing system may receive, from a user interface (UI) of the system or from a client computer, an instruction to print a print job held by the system, and may execute a printing process on the print job. Also, the print processing system may read a file in a PDF format or the like (print job) from an input interface of the print processing system (for example, a reading device for reading a disc, such as a digital versatile disc (DVD), a universal serial bus (USB) interface to which a USB memory is connected, or the like) to the system, and may execute a printing process on the file. Also, the print processing system may process a print job upon a file of the print job being input to a specific folder (called a hot folder) created in the print processing system or a client computer.

A print job processed by the print processing system includes print data described in a page description language (PDL). The print data may include an image to be printed described in a PDL, or may include a raster image on which a raster image processor (RIP) process has been executed and additional information described in a PDL, such as a print attribute. A RIP in the print processing system does not need to execute interpretation and rasterization on a print job including the latter print data. Hereinafter, a print job including the former print data will be referred to as a "RIP-unprocessed job", and a print job including the latter print data will be referred to as a "RIP-processed job". Examples of a RIP-processed job held by the print processing system include (A) a job which is held in the print processing system and on which a RIP process has been executed, (B) a job which includes RIP-processed data created by an apparatus and which has been read into the print processing system, and (C) a job which includes RIP-processed data created by an apparatus and which has been input to a hot folder.

The print processing system illustrated in FIG. 1 includes a job management module 10, two RIPs 20A and 20B, and a printer 30. The job management module 10 and the RIPs 20A and 20B are mounted as software modules in a single computer (for example, a print controller, a print server, or a computer in a printing apparatus).

The printer 30 prints raster image data received from the RIPs 20A and 20B onto a sheet.

The RIPs 20A and 20B are processing modules that interpret print data described in a PDL and generate raster image data. Each of the RIPs 20A and 20B is capable of processing one of PDLs different from each other at high speed. That is, the RIP 20A processes data described in a first PDL at higher speed than the RIP 20B. The RIP 20B processes data described in a second PDL, which is different from the first PDL, at higher speed than the RIP 20A. In the description given below, it is assumed that the RIP 20A is a RIP for PostScript (processes PostScript data at higher speed than the RIP 20B), and that the RIP 20B is a RIP for PDF (processes PDF data at higher speed than the RIP 20A), for example.

The RIP 20A includes a raster image creating unit 22A, a raster image transferring unit 24A, and a printer monitoring unit 26A. Likewise, the RIP 20B includes a raster image creating unit 22B, a raster image transferring unit 24B, and a printer monitoring unit 26B. The raster image creating units 22A and 22B interpret PDL data and generate raster image data. The raster image transferring units 24A and 24B transfer raster image data to the printer 30, and transmit various control signals for printing the raster image data to the printer 30. The printer monitoring units 26A and 26B monitor printing of raster image data transmitted to the printer 30 until the printing is completed.

As described above, in the exemplary embodiment, the functions of the RIPs 20A and 20B have two stages, that is, the raster image creating units 22A and 22B and the raster image transferring units 24A and 24B, so that a print job undergoes a process in a necessary stage. Specifically, a RIP-unprocessed job undergoes the processes in both stages, and a RIP-processed job undergoes the process in the latter stage, that is, the process executed by the raster image transferring unit 24A or 24B. Each print job undergoes the processes executed by the same RIP (RIP 20A or 20B) in the case of undergoing the processes in both stages.

The job management module 10 is a processing module that manages execution of a print job, such as a print job input from the client computer described above (not illustrated) or a print job held by the print processing system.

A print job includes print data described in a PDL. The print data may include an image to be printed described in a PDL, or may include a RIP-processed raster image and additional information described in a PDL, such as a print attribute. In the exemplary embodiment, it is assumed that a print job includes, in addition to print data, information specifying which of the RIPs 20A and 20B is to be used to process the print job (hereinafter referred to as "specified-RIP information"). The specification is performed by a user who provides an instruction to execute a print job, to a printer driver of the client computer or a UI of the print processing system, for example. Accordingly, the printer driver or the UI transmits identification information about the specified RIP, that is, specified-RIP information, to the job management module 10 in association with the print job (or such that the specified-RIP information is included in the data of the print job).

The job management module 10 includes a RIP queue 12, a print queue 14, a job-being-processed list 16, and a currently processing RIP information 18.

The RIP queue 12 is a queue for one or more print jobs that are to be processed in the first stage among two stages, that is, to be processed by the raster image creating unit 22A or 22B. The print queue 14 is a queue for one or more print jobs that are to be processed in the second stage, that is, to be processed by the raster image transferring unit 24A or 24B. As illustrated in FIG. 2, individual print jobs (typically, pieces of identification information about the individual print jobs) are input to each of the RIP queue 12 and the print queue 14 in association with specified-RIP information corresponding to the print jobs. In FIG. 2, the RIP 20A is represented by "RIP-A", and the RIP 20B is represented by "RIP-B". The print jobs in each of the RIP queue 12 and the print queue 14 are sequentially taken out in a first-in first-out (FIFO) manner, and are processed by the RIP 20A or 20B. A RIP-unprocessed job that has been specified as an object to be printed is first input to the RIP queue 12, and undergoes rasterization by a specified one of the raster image creating units 22A and 22B when the turn comes. After the rasterization, the job is input to the print queue 14, is transferred to the printer 30 by a specified one of the raster image transferring units 24A and 24B when the turn comes, and is printed. On the other hand, a RIP-processed job that has been specified as an object to be printed is input to the print queue 14 with the RIP queue 12 being skipped, is transferred to the printer 30 by a specified one of the raster image transferring units 24A and 24B when the turn comes, and is printed.

The job-being-processed list 16 is a list of print jobs that are currently being processed. Here, "being processed" corresponds to a period from when a process of a job in the first stage (the raster image creating units 22A and 22B) starts to when transfer of the job in the second stage (the raster image transferring units 24A and 24B) ends, regarding a RIP-unprocessed job. Also, "being processed" corresponds to a period from when transfer of a job in the second stage (the raster image transferring units 24A and 24B) starts to when the transfer ends, regarding a RIP-processed job. In the exemplary embodiment, the RIP 20A or 20B is caused to exclusively execute a process. Thus, each of the print jobs included in the job-being-processed list 16 is being processed by one of the RIPs 20A and 20B that is currently operating. In other words, control is performed so that the job-being-processed list 16 does not include mixture of a print job having specified-RIP information indicating the RIP 20A and a print job having specified-RIP information indicating the RIP 20B. Details of the control will be described below.

The currently processing RIP information 18 is identification information about a RIP that is currently executing a process. The job-being-processed list 16 includes identification information about a print job that is being processed by the RIP indicated by the currently processing RIP information 18.

FIG. 1 illustrates the print processing system including the two RIPs 20A and 20B. The control according to the exemplary embodiment may be applied to a system including three or more RIPs.

The job management module 10 manages execution of a print job in the following manner by using the above-described RIP queue 12, the print queue 14, the job-being-processed list 16, and the currently processing RIP information 18. The management of execution of a print job performed by the job management module 10, which includes five processes (a) to (e), will be described below.

SYMBOLS USED FOR DESCRIPTION

The meanings of symbols used in the description about the processes are as follows.

P1, P2, . . . and PN represent the types of RIPs, which have N types (two types in the example in FIG. 1).

Pc represents the RIP that is currently executing a process (that is, the RIP indicated by the currently processing RIP information 18). Pc may be in a state of P1 to PN or P0. P0 represents there is no RIP that is currently executing a process (that is, all the N types of RIPs are not executing a process).

Pj represents the type of the RIP specified for an input print job j (that is, the value of the specified-RIP information for the print job j).

Pr represents the type of the RIP specified for the print job at the top of the RIP queue 12 (that is, the specified-RIP information for the job at the top of the RIP queue 12).

Pp represents the type of the RIP specified for the print job at the top of the print queue 14 (that is, the specified-RIP information for the job at the top of the print queue 14).

Process (a): Add Input Print Job to Queue

An example of process (a) of adding a print job (the identification number thereof is j) specified as an object of a printing process to a queue will be described with reference to FIG. 3.

Upon receiving a print job j, the job management module determines whether or not the print job j is a RIP-unprocessed job in step a1. If the print job j is a RIP-unprocessed job, the job management module 10 adds the print job j to the end of the RIP queue 12 in step a2, and instructs the RIP specified as a RIP for processing the print job j, that is, Pj, to start a RIP process in step a3. The RIP (Pj) receives the instruction, and executes the process in accordance with the procedure illustrated in FIG. 9 (the details will be described below). Accordingly, if the job j is the first job, a query is issued by a RIP to the queue including the job j, and the RIP specified for the job j starts processing (that is, the RIP is the currently processing RIP).

If it is determined in step a1 that the print job j is not a RIP-unprocessed job (that is, a RIP-processed job), the job management module 10 adds the print job j to the end of the print queue 14 in step a4, and instructs the RIP specified as a RIP for processing the print job j, that is, Pj, to start a printing process in step a5. The RIP (Pj) receives the instruction, and executes the process in accordance with the procedure illustrated in FIG. 9 (the details will be described below).

Process (b): Response to Query to Rip Queue

Figure 4:
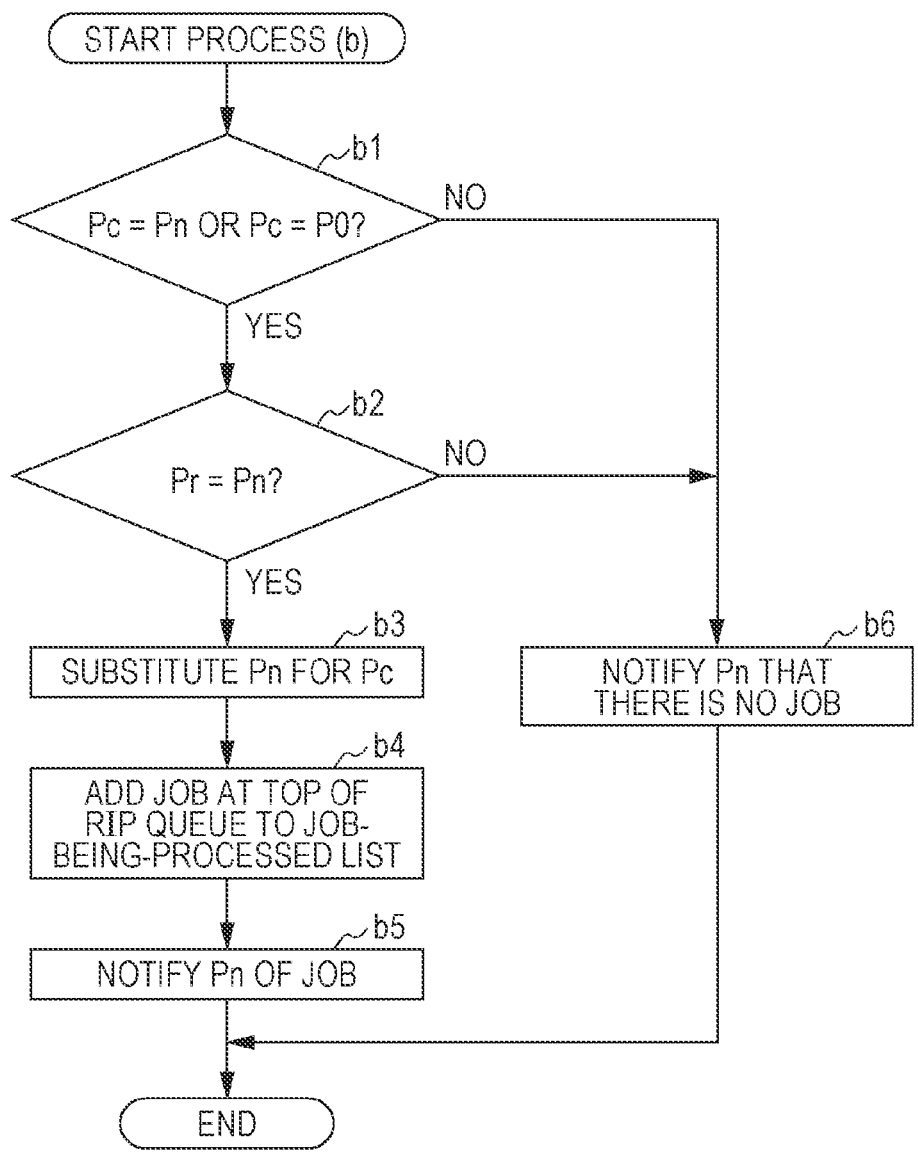
FIG. 4 is a diagram illustrating an example of a procedure of process (b) executed by the job management module.

An example of process (b) executed by the job management module 10 when a query inquiring whether or not there is a print job to be processed by the RIP queue 12 arrives from any of the RIPs (hereinafter represented by Pn) will be described with reference to FIG. 4.

Upon receiving a query about the RIP queue 12 from a RIP (Pn), the job management module 10 determines in step b1 whether or not any of the following conditions is satisfied: the currently processing RIP (Pc) indicated by the currently processing RIP information 18 matches the RIP that has issued the query (Pc=Pn); and there is no currently processing RIP (Pc=P0). If any of the conditions is satisfied, the job management module 10 determines in step b2 whether or not the RIP that has issued the query (Pn) matches the RIP indicated by the specified-RIP information for the print job at the top of the RIP queue 12 (Pr). The execution order of steps b1 and b2 may be reversed.

If both the determination results in steps b1 and b2 are "YES", the job management module 10 substitutes the identification information Pn about the RIP that has issued the query for the value Pc of the currently processing RIP information 18 in step b3. If it is determined in step b1 that Pc=Pn, the state is maintained. For example, if it is determined in step b1 that there is no currently processing RIP (Pc=P0), the RIP that has issued the query (Pn) is newly specified in step b3 as a RIP that executes a process. Subsequently, the job at the top of the RIP queue 12 is added to the end of the job-being-processed list 16 in step b4. In step b4, if the job at the top of the RIP queue 12 exists in the job-being-processed list 16, the job management module 10 does not redundantly add the job to the job-being-processed list 16. Subsequently, in step b5, the job management module 10 notifies the RIP that has issued the query (Pn) of the identification information about the job at the top, the job being to be subsequently processed by the RIP. The execution order of steps b3 to b5 is not limited thereto, and may be changed.

If any one of the determination results in steps b1 and b2 is "NO", the job management module 10 notifies the RIP that has issued the query (Pn) that there is no print job corresponding to the query in step b6.

Process (c): Response to Query to Print Queue

Figure 5:
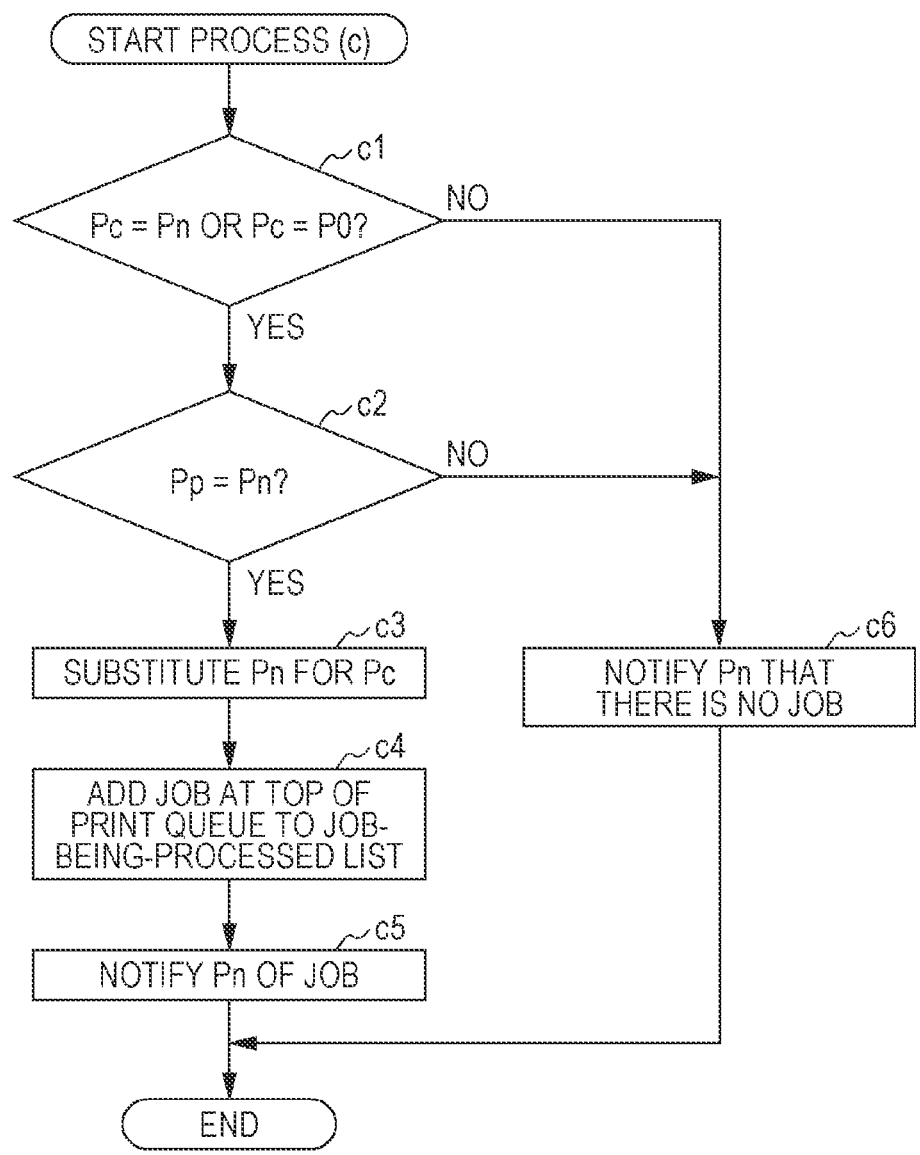
FIG. 5 is a diagram illustrating an example of a procedure of process (c) executed by the job management module.

An example of process (c) executed by the job management module 10 when a query inquiring whether or not there is a print job to be processed by the print queue 14 arrives from any of the RIPs (hereinafter represented by Pn) will be described with reference to FIG. 5.

Upon receiving a query about the print queue 14 from a RIP (Pn), the job management module 10 determines in step c1 whether or not any of the following conditions is satisfied: the currently processing RIP (Pc) indicated by the currently processing RIP information 18 matches the RIP that has issued the query (Pc=Pn); and there is no currently processing RIP (Pc=P0). If any of the conditions is satisfied, the job management module 10 determines in step c2 whether or not the RIP that has issued the query (Pn) matches the RIP indicated by the specified-RIP information for the print job at the top of the print queue 14 (Pp). The execution order of steps c1 and c2 may be reversed.

If both the determination results in steps c1 and c2 are "YES", the job management module 10 substitutes the identification information Pn about the RIP that has issued the query for the value Pc of the currently processing RIP information 18 in step c3. If it is determined in step c1 that Pc=Pn, the state is maintained. For example, if it is determined in step c1 that there is no currently processing RIP (Pc=P0), the RIP that has issued the query (Pn) is newly specified in step c3 as a RIP that executes a process. Subsequently, the job at the top of the print queue 14 is added to the end of the job-being-processed list 16 in step c4. In step c4, if the job at the top of the print queue 14 exists in the job-being-processed list 16, the job management module 10 does not redundantly add the job to the job-being-processed list 16. Subsequently, in step c5, the job management module 10 notifies the RIP that has issued the query (Pn) of the identification information about the job at the top, the job being to be subsequently processed by the RIP. The execution order of steps c3 to c5 is not limited thereto, and may be changed.

If any one of the determination results in steps c1 and c2 is "NO", the job management module 10 notifies the RIP that has issued the query (Pn) that there is no print job corresponding to the query in step c6.

Figure 6:
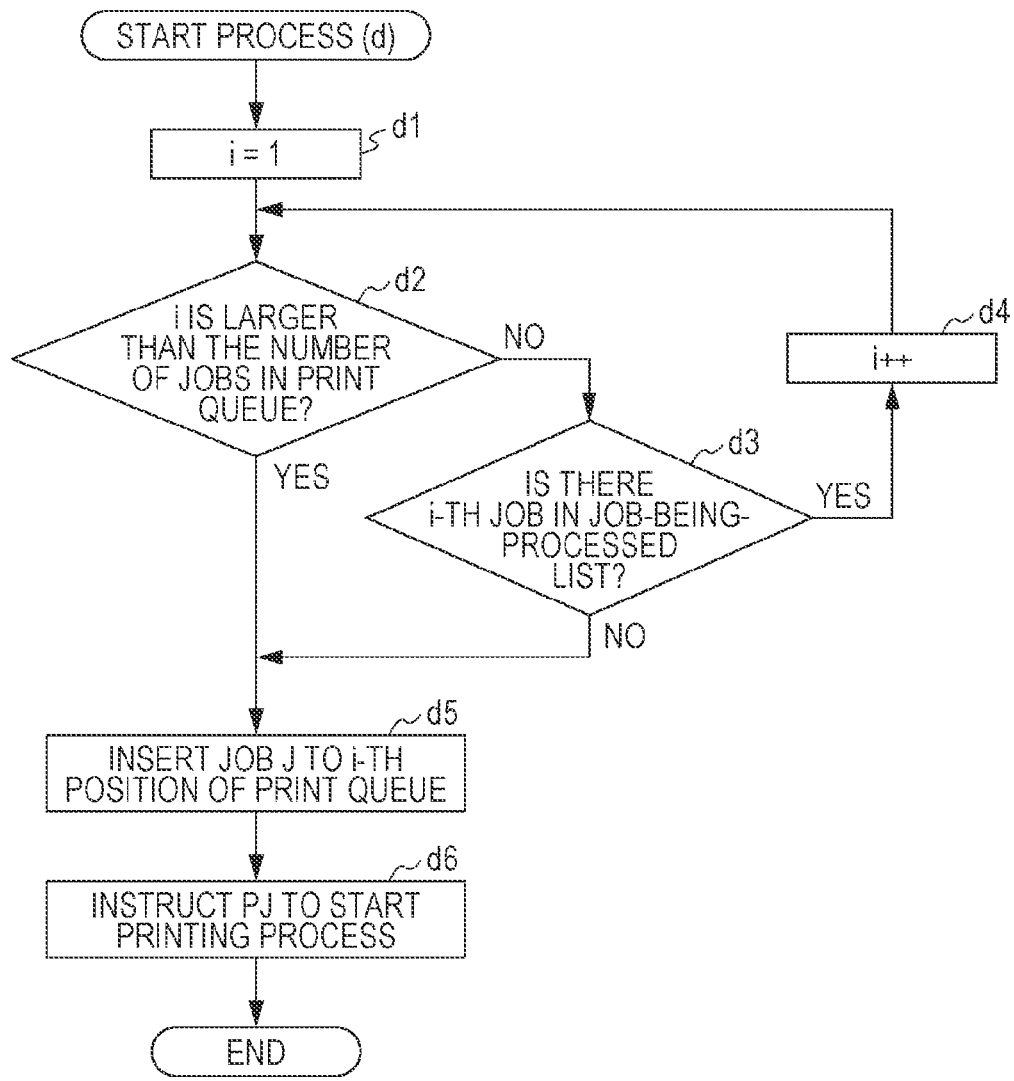
FIG. 6 is a diagram illustrating an example of a procedure of process (d) executed by the job management module.

Process (d): Process Executed in Response to Notification that Raster Image has been Created An example of process (d) executed by the job management module 10 in response to a notification that a raster image for a print job (hereinafter identification number J) has been created from any of the RIPs (hereinafter represented by Pn) will be described with reference to FIG. 6.

Upon receiving a notification that a raster image has been created, the job management module 10 initializes a control variable i to 1 in step d1. In this process, print jobs are sequentially examined from the top of the print queue 14. The variable i indicates the position of the print job to be examined with respect to the top of the print queue 14. Subsequently, the job management module 10 determines in step d2 whether or not the variable i is larger than the number of jobs that currently exist in the print queue 14. Accordingly, it is determined whether or not all the print jobs in the print queue 14 have been examined.

If the determination result in step d2 is "NO", the job management module 10 determines in step d3 whether or not the i-th job with respect to the top of the print queue 14 exists in the job-being-processed list 16. If the i-th job exists therein, the job management module 10 increments the variable i by one in step d4, and the process returns to step d2. In the loop of steps d2, d3, and d4, the job management module 10 determines whether or not each of the jobs in the print queue 14 is included in the job-being-processed list 16, that is, whether or not the job is being processed, sequentially from the top of the print queue 14.

In this loop, if it is determined in step d3 that the i-th job in the print queue 14 does not exist in the job-being-processed list 16, the job management module 10 inserts, to the i-th position of the print queue 14, the job J for which it has been reported that a raster image has been created in the notification that caused this process procedure in step d5. That is, the job J is inserted to the position where there are no more jobs that are being processed in the print queue 14, in other words, the position between the first job that is not being processed with respect to the top of the print queue 14 and the job immediately before the first job. In the case of a configuration in which a raster image creation completion notification is issued upon raster images of all the pages in a job being created, the job J may be deleted from the RIP queue 12 in step d5, for example. In the case of a configuration in which a raster image creation completion notification is issued upon a raster image of the first part of a job being created, the RIP may transmit, to the job management module 10, a notification indicating that all the raster images of the job J have been created upon the raster images of all the pages in the job J being created, and the job management module 10 may delete the job J from the RIP queue 12 in response to the notification.

After step d5, in step d6, the job management module 10 instructs the RIP indicated by the specified-RIP information corresponding to the job J (PJ) to start a printing process. The RIP (PJ) matches the RIP (Pn) that has transmitted the raster image creation completion notification that is a trigger of this flow, and also matches the RIP (Pc) that is currently executing a process indicated by the currently processing RIP information 18 as long as the currently processing RIP information 18 is not cleared in process (e) described below. The RIP (PJ) receives the instruction and starts a process in accordance with the procedure illustrated in FIG. 9 (the details will be described below).

If the determination result in step d2 is "YES", this means all the jobs from the top to the end in the print queue 14 are being processed. In this case, "i-th" means the position subsequent to the last job in the print queue 14. Thus, the job management module 10 inserts the job J to the i-th position (end) of the print queue 14 in step d5, and instructs the RIP (PJ) to start a print process in step d6.

Process (e): Process Executed in Response to Notification that Printing has been Completed An example of process (e) executed by the job management module 10 in response to a notification that printing has been executed on a print job (hereinafter identification number J) from any of the RIPs (hereinafter represented by Pn) will be described with reference to FIGS. 7 and 8.

Upon receiving a notification that printing has been completed, the job management module 10 deletes the job J on which printing has been executed from the print queue 14 and the job-being-processed list 16 in step e1, and determines in step e2 whether or not the job-being-processed list 16 has become empty as a result of the deletion. If the job-being-processed list 16 has not become empty, process (e) ends.

If the job-being-processed list 16 has become empty, the job management module 10 determines in step e3 whether or not the RIP (Pr) specified for the job at the top of the RIP queue 12 matches the currently processing RIP (Pc) indicated by the currently processing RIP information 18. If the RIPs match, the job management module 10 instructs the currently processing RIP (Pc) to start a RIP process in step e4. Furthermore, the job management module 10 determines in step e5 whether or not the RIP (Pp) specified for the job at the top of the print queue 14 matches the currently processing RIP (Pc). If the RIPs match, the job management module 10 instructs the currently processing RIP (Pc) to start a printing process in step e6. If the determination result in step e5 is "NO", that is, if Pp≠Pc, process (e) ends.

If the determination result in step e3 is "NO", that is, if Pr≠Pc, the job management module 10 determines in step e7 whether or not the RIP (Pp) specified for the job at the top of the print queue 14 matches the currently processing RIP (Pc). If the determination result is "YES", that is, if Pp=Pc, the process proceeds to step e6.

If the determination result in step e7 is "NO", there is no job that is being processed, and the currently processing RIP (Pc) does not match any of the RIP (Pr) specified for the job at the top of the RIP queue 12 and the RIP (Pp) specified for the job at the top of the print queue 14. The jobs in each of the RIP queue 12 and the print queue 14 are processed in a FIFO scheme. Thus, in a state where the currently processing RIP (Pc) is not specified for any of the jobs at the top of those queues, it is necessary to stop operation of the currently processing RIP (Pc) and to operate another RIP. Thus, process (e) proceeds to step e8 in FIG. 8.

Figure 8:
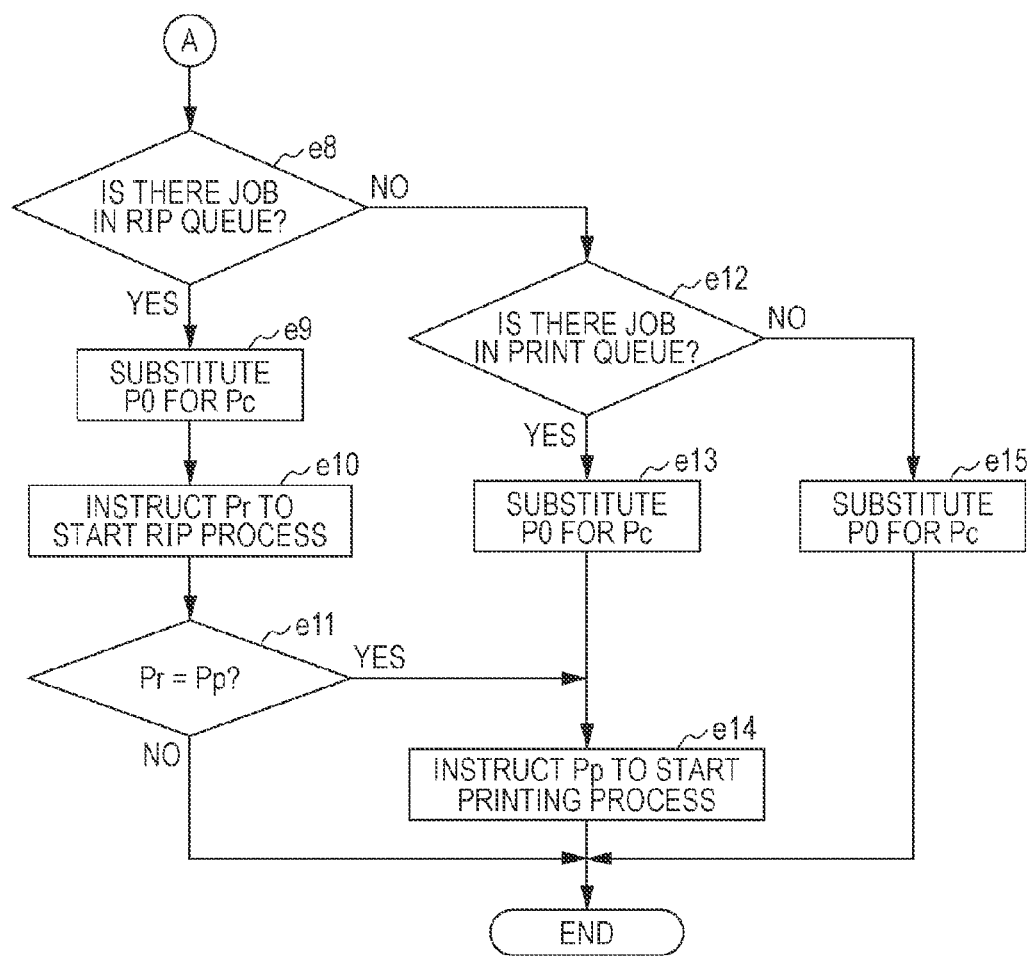
FIG. 8 is a diagram illustrating an example of the latter half of the procedure of process (e) executed by the job management module.

Referring to FIG. 8, the job management module 10 determines in step e8 whether or not there is a job in the RIP queue 12. If the determination result is "YES", the job management module 10 clears the currently processing RIP information 18 (substitutes P0 for Pc) in step e9, and instructs the RIP (Pr) specified for the job at the top of the RIP queue 12 to start a RIP process in step e10. Subsequently, the job management module 10 determines in step e11 whether or not the RIP (Pp) specified for the job at the top of the print queue 14 matches the RIP (Pr) specified for the job at the top of the RIP queue 12. If the RIPs match, the job management module 10 instructs the RIP (Pr) to start a printing process in step e14, and the process ends. If the RIPs do not match, the process ends.

If the determination result in step e8 is "NO", the job management module 10 determines in step e12 whether or not there is a job in the print queue 14. If the determination result in step e12 is "YES", the job management module 10 clears the currently processing RIP information 18 (substitutes P0 for Pc) in step e13, instructs the RIP (Pp) specified for the job at the top of the print queue 14 to start a printing process in step e14, and ends the process.

If the determination result in step e12 is "NO", the job management module 10 clears the currently processing RIP information 18 (substitutes P0 for Pc) in step e15, and ends the process.

As described above, in process (e), if there is a job in the job-being-processed list 16, the currently processing RIP (Pc) processes the job because the job is specified so as to be processed by the currently processing RIP (Pc). If there is no job in the job-being-processed list 16, an instruction to start a process is provided to the currently processing RIP (Pc), the process being to be executed for the job at the top of one of the RIP queue 12 and the print queue 14, and thereby the currently processing RIP (Pc) continues processing. If there is no job in the job-being-processed list 16 and if both the RIPs specified for the jobs at the top of the RIP queue 12 and the print queue 14 are different from the currently processing RIP (Pc), the job management module 10 clears the Pc and instructs the RIP queue 12 and/or the print queue 14 having a job to start processing.

Processes Executed by RIP

Figure 9:
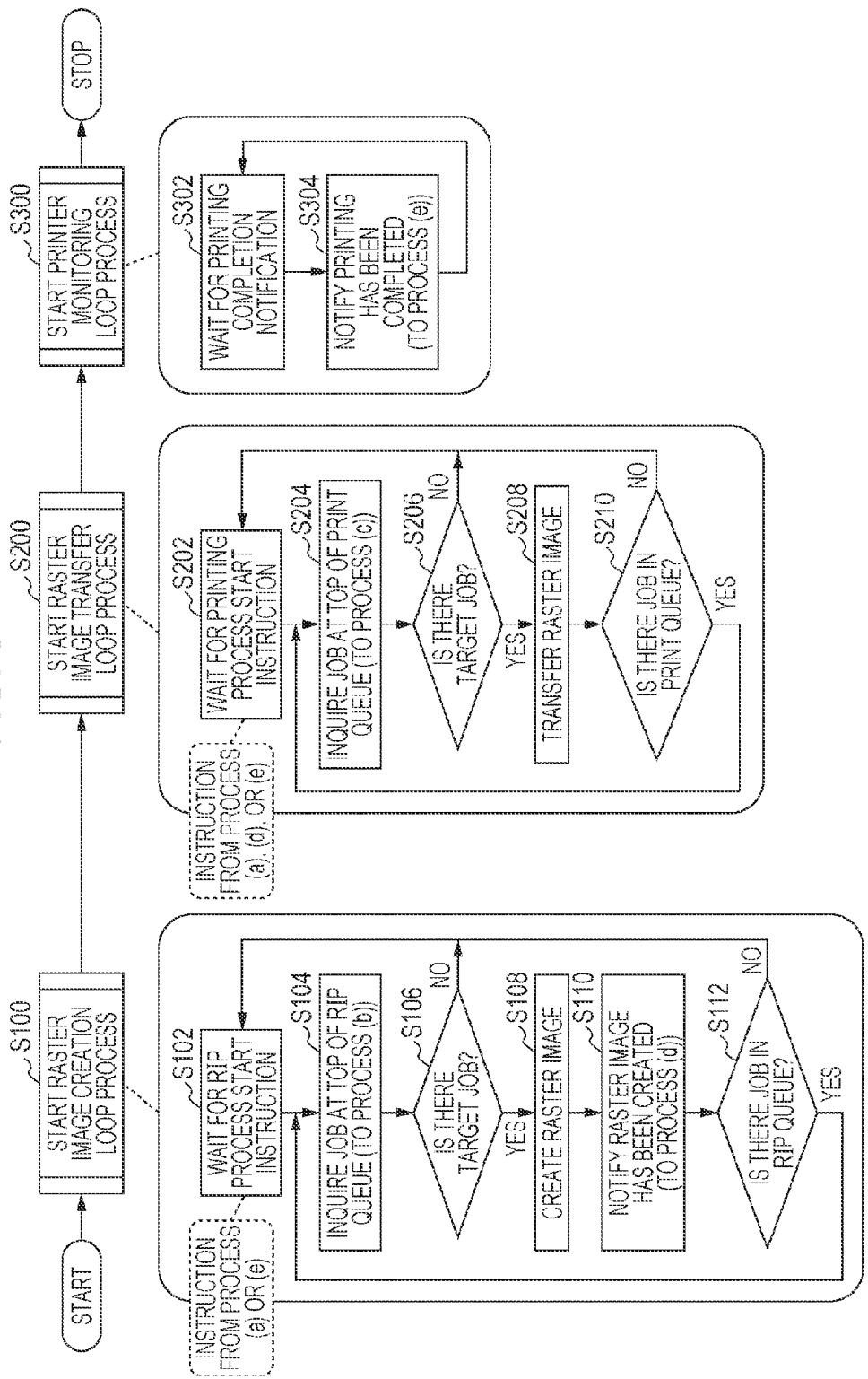
FIG. 9 is a diagram illustrating an example of a process procedure of a RIP.

Next, an example of processes executed by each of the RIPs 20A and 20B will be described with reference to FIG. 9. As illustrated in FIG. 9, upon being activated by power-on or the like, each of the RIPs 20A and 20B starts a raster image creation loop process, a raster image transfer loop process, and a printer monitoring loop process (steps S100, S200, and S300). These loop processes correspond to the raster image creating units 22A and 22B, the raster image transferring units 24A and 24B, and the printer monitoring units 26A and 26B illustrated in FIG. 1, respectively. The raster image creation loop process (steps S102 to S110) and the raster image transfer loop process (steps S202 to S208) are executed in parallel.

In the raster image creation loop process, a RIP (raster image creating unit) waits for receiving a RIP process start instruction from the job management module 10 in step S102. Upon receiving the RIP process start instruction, the RIP inquires of the job management module 10 the job at the top of the RIP queue 12 in step S104. The job management module 10 receives the query and executes the above-described process (b). As a result of the query, the RIP determines whether or not the response from the job management module 10 indicates that there is a target job in step S106 (any one of steps b5 and b6 in FIG. 4). If the response indicates that there is no target job, the process returns to step S102. If the response indicates that there is a target job (that is, if the currently processing RIP (Pc) is not a RIP other than the RIP itself and if the RIP specified for the job at the top of the RIP queue 12 is the RIP itself), the RIP interprets the PDL data of the job at the top of the RIP queue 12 and executes rasterization in step S108. After the raster image of the job has been created, the RIP notifies, in step S110, the job management module 10 that the raster image has been created. The job management module 10 receives the notification and executes the above-described process (d). Also, after the raster image has been created, the RIP (raster image creating unit) determines in step S112 whether or not there is a job in the RIP queue 12. If there is a job in the RIP queue 12, the process returns to step S104, and the RIP inquires the job at the top of the RIP queue 12. If there is no job in the RIP queue 12, the process returns to step S102, and the RIP waits for a RIP process start instruction.

The notification in step S110 may be performed after raster images of an entire print job (for example, raster images of all pages) have been created, or after a raster image of a first part of a print job has been created. The "first part of a print job" in the latter example may be the first page of a print job, the first band of the first page (a band area defined by a predetermined number of lines in a page), or a group of predetermined pages from the top of a print job.

In the latter example, if a RIP-unprocessed job is input to the job management module 10 when there is no job in both the RIP queue 12 and the print queue 14, the job is first input to the RIP queue 12 and is then supplied to the raster image creating unit 22A or 22B. At the time when creation of a raster image of a first part of the job is completed by the raster image creating unit 22A to 22B, the job is input to the print queue 14 and is then supplied to the raster image transferring unit 24A or 24B. Then, the created raster image is transferred to the printer 30 by the raster image transferring unit 24A or 24B, and is printed onto a sheet. In this way, the RIP 20A or 20B notifies the job management module 10 at the time when creation of a raster image of a first predetermined part of a job is completed. Accordingly, transfer and printing of raster image data of the job and creation of a raster image of the remaining part of the job are executed in parallel.

In the raster image transfer loop process, the RIP (raster image transferring unit) waits for receiving a printing process start instruction from the job management module 10 in step S202. Upon receiving the printing process start instruction, the RIP inquires of the job management module 10 the job at the top of the print queue 14 in step S204. The job management module 10 receives the query and executes the above-described process (c). As a result of the query, the RIP determines in step S206 whether or not the response from the job management module 10 indicates that there is a target job (that is, any one of steps c5 and c6 in FIG. 5). If the response indicates that there is no target job, the process returns to step S202. If the response indicates that there is a target job (that is, if the currently processing RIP (Pc) is not a RIP other than the RIP itself and if the RIP specified for the job at the top of the print queue 14 is the RIP itself), the RIP transfers a raster image of the job at the top of the print queue 14 to the printer 30 so that the image is printed in step S208. After transferring the raster image, the RIP (raster image transferring unit) determines in step S210 whether or not there is a job in the print queue 14. If there is a job in the print queue 14, the process returns to step S204, and the RIP inquires the job at the top of the print queue 14. If there is no job in the print queue 14, the process returns to step S202, and the RIP waits for a printing process start instruction.

After transferring the raster image of the job J to the printer 30 in the raster image transfer loop process, the RIP waits for, in the printer monitoring loop process, receiving a printing completion notification for the job J from the printer 30 in step S302. Upon receiving the printing completion notification, the RIP notifies the job management module 10 that printing for the job J has been completed in step S304. The job management module 10 receives the notification, and executes the above-described process (e).

Example Flow of Processes

Figure 10:
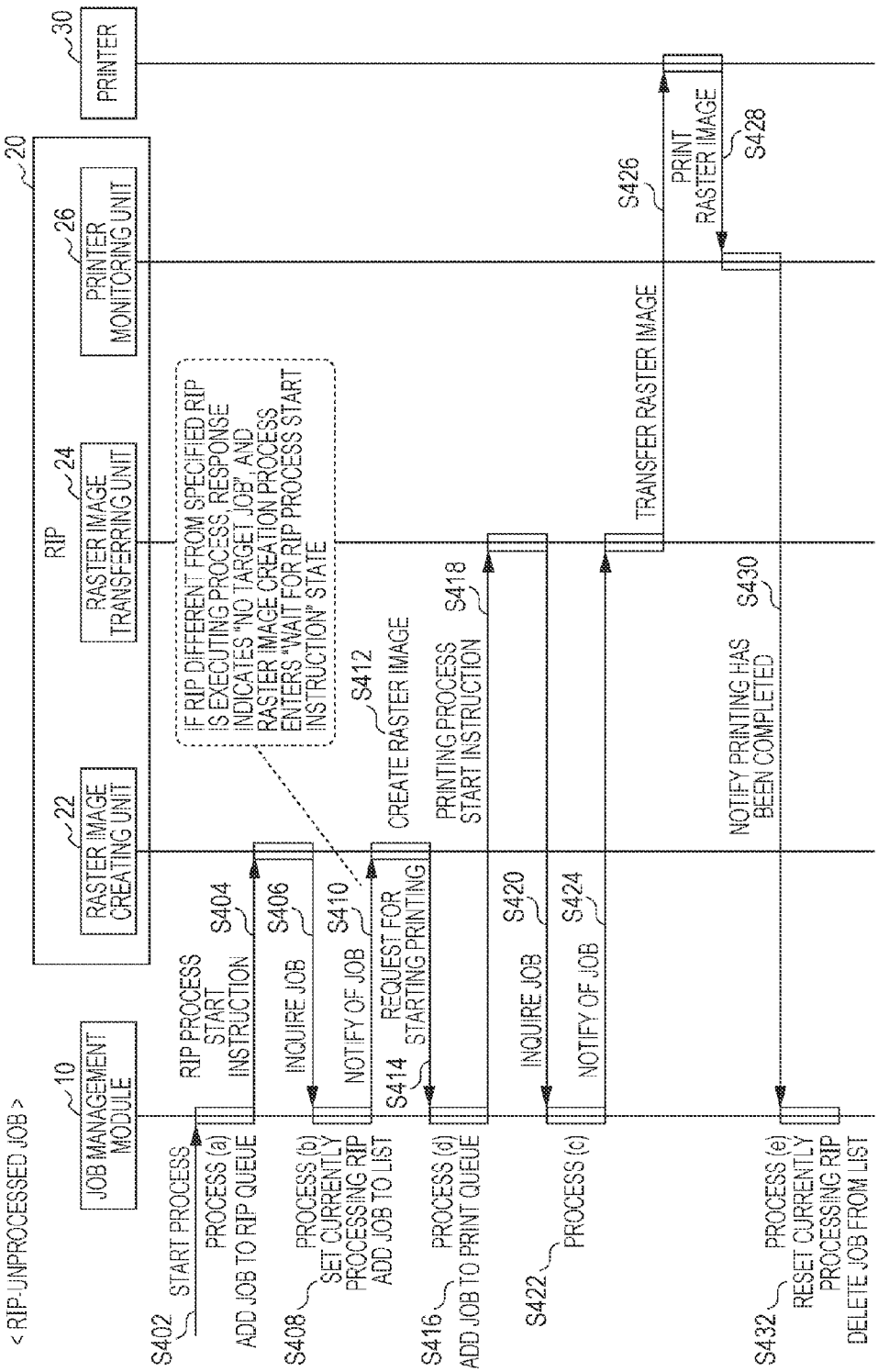
FIG. 10 is a diagram illustrating an example flow of processes executed by a print processing system when a RIP-unprocessed job is input.

Next, an example flow of processes executed by the print processing system according to the exemplary embodiment when a RIP-unprocessed job is input will be described with reference to FIG. 10.

Upon receiving a RIP-unprocessed job, the job management module 10 executes the above-described process (a), thereby adding the job to the RIP queue 12 in step S402, and instructing the raster image creating unit 22 of the RIP 20 indicated by the specified-RIP information for the job to start a RIP process in step S404. At this time, the raster image creating unit 22 is not executing a process on a job and is waiting for an instruction (step S102 in FIG. 9). Thus, upon receiving the instruction, the raster image creating unit 22 inquires of the job management module 10 the job at the top of the RIP queue 12 in step S406 (step S104 in FIG. 9). The job management module 10 receives the query, and executes the above-described process (b). That is, if the other RIP is not executing a process, the job management module 10 registers, in the currently processing RIP information 18, the RIP 20 that has issued the query (step b3 in FIG. 4), and adds the job to the job-being-processed list 16 in step S408 (step b4 in FIG. 4). Then, the job management module 10 notifies the raster image creating unit 22 of the job at the top of the RIP queue 12 in step S410 (step b5 in FIG. 4). When the other RIP is executing a process, the job management module 10 notifies the raster image creating unit 22 that there is no target job (step b6 in FIG. 4), and causes the RIP 20 that has issued the query to wait for a RIP process start instruction. Hereinafter, description will be given of a flow after the job management module 10 has notified the raster image creating unit 22 of the job at the top of the RIP queue 12 in step S410.

In this case, the raster image creating unit 22 obtains and interprets PDL data of the job at the top, and thereby creating a raster image in step S412. After creating the raster image, the raster image creating unit 22 notifies the job management module 10 of the completion (request for starting printing) in step S414.

The job management module 10 receives the notification (request), and executes the above-described process (d), thereby adding the job, on which the raster image creation process has been executes, to the print queue 14 in step S416, and instructing the raster image transferring unit 24 of the RIP 20 to start a printing process in step S418. The raster image transferring unit 24 receives the instruction, and inquires of the job management module 10 the job at the top of the print queue 14 in step S420 (step S204 in FIG. 9). The job management module 10 receives the query, executes the above-described process (c) in step S422, and notifies the raster image transferring unit 24 of the job at the top of the print queue 14 in step S424. The raster image transferring unit 24 transfers the raster image of the job to the printer 30 in step S426. The printer 30 prints the transferred raster image onto a sheet in step S428. After the printing of the raster image has been completed, the printer monitoring unit 26 of the RIP 20 detects the completion, and notifies the job management module 10 that printing has been completed in step S430. Accordingly, in step S432, the job management module 10 executes the above-described process (e), thereby deleting the job on which printing has been executed from the job-being-processed list 16, so that the currently processing RIP information 18 is reset.

Figure 11:
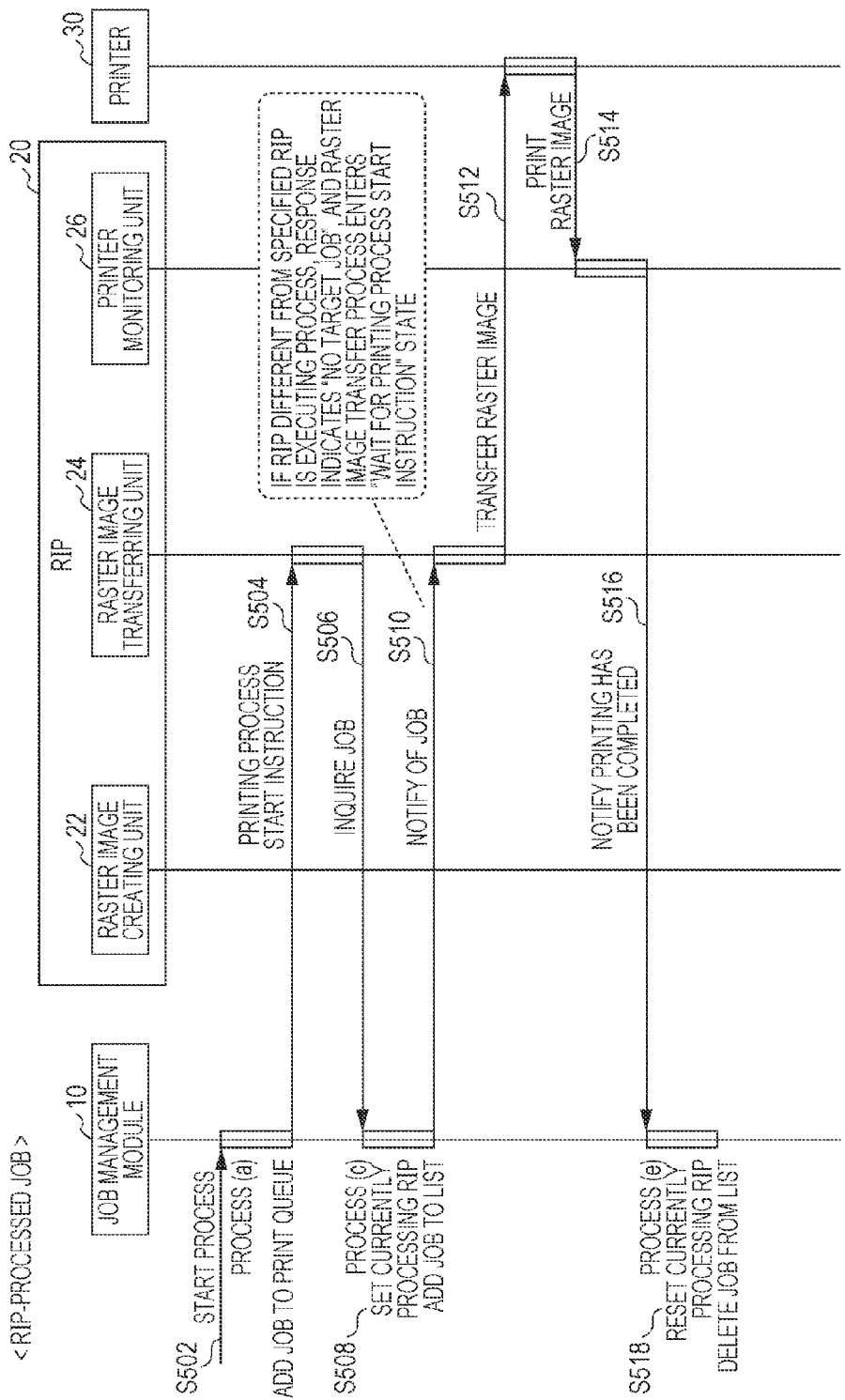
FIG. 11 is a diagram illustrating an example flow of processes executed by the print processing system when a RIP-processed job is input.

Next, an example flow of processes executed by the print processing system according to the exemplary embodiment when a RIP-processed job is input will be described with reference to FIG. 11.

Upon receiving a RIP-processed job, the job management module 10 executes the above-described process (a), thereby adding the job to the print queue 14 in step S502, and instructing the raster image transferring unit 24 of the RIP 20 indicated by the specified-RIP information for the job to start a printing process in step S504. The raster image transferring unit 24 receives the instruction, and inquires of the job management module 10 the job at the top of the print queue 14 in step S506. The job management module 10 receives the query, executes the above-described process (c) in step S508, and notifies the raster image transferring unit 24 of the job at the top of the print queue 14 in step S510. The raster image transferring unit 24 transfers the raster image of the job at the top of the print queue 14 to the printer 30 in step S512. The printer 30 prints the transferred raster image onto a sheet in step S514. After printing of the raster image has been completed, the printer monitoring unit 26 of the RIP 20 detects the completion, and notifies the job management module 10 that the printing of the job has been completed in step S516. Accordingly, in step S518, the job management module 10 executes the above-described process (e), thereby deleting the job on which printing has been executed from the job-being-processed list 16, so that the currently processing RIP information 18 is reset.

Example Flow of Processes when Plural Jobs are Sequentially Input

Next, the behavior of the print processing system according to the exemplary embodiment when plural jobs are sequentially input will be described using specific examples.

First Example

In a first example, the following case is assumed. When the print processing system is in an idle state (the state where all the RIP queue 12, print queue 14, and job-being-processed list 16 are empty), a RIP-unprocessed job A that is specified to be processed by the RIP 20A in FIG. 1 is input, and immediately thereafter, a RIP-processed job B that is specified to be processed by the RIP 20B is input. In this case, the first half of the process executed by the print processing system is as follows.

(1) The job A is added to the RIP queue 12 in process (a).

(2) The job B is added to the print queue 14 in process (a).

(3) In process (b), creation of a raster image for the job A is started by the RIP 20A (the currently processing RIP is the RIP 20A).

(4) After creation of the raster image for the job A has been completed, the job A is added to the end of the print queue 14, according to an ordinary manner of managing the queue (in the process not using the above-described process (d)).

In this case, in process (c), the RIP 20B is specified for the job B at the top of the print queue 14. Since the RIP 20B does not match the RIP 20A, which is currently executing the process, the determination result in step b1 in FIG. 4 is "NO", it is determined that there is no job to be processed (there is no target job), and the process stops.

Here, if the job-being-processed list 16 (including the job A) and the currently processing RIP information 18 (indicating the RIP 20A) are cleared, a process of transferring (printing) the job B at the top of the print queue 14 is executed. In this case, however, printing is executed on the job B before the job A, the process for which started earlier, and the processing order is reversed.

In contrast, if the above-described process (d) is executed, process (4) is replaced by the following process (4').

(4') After creation of raster image data for the job A has been completed, the job A is inserted to the position before the job B in the print queue 14.

As a result, the job A, for which the currently processing RIP 20A is specified, is at the top of the print queue 14. Thus, in process (c) executed thereafter, the job A is processed by the currently processing RIP 20A. In this way, the printing process is executed without changing the RIP to be operated and without changing the print order of the jobs using different RIPs from the order in which the jobs are input.

Second Example

Next, a second example will be described. In the second example, it is assumed that three jobs A1, A2, and B1 are input in this order almost simultaneously when the print processing system is in an idle state.

A1: RIP-processed job specified to be processed by the RIP 20A

A2: RIP-unprocessed job specified to be processed by the RIP 20A

B1: RIP-processed job specified to be processed by the RIP 20B

Also, it is assumed that another job is not input until printing of the three jobs has been completed. In this case, processes are executed in the following flow.

(1) In process (a), the individual jobs are input to the RIP queue 12 and the print queue 14. The RIPs 20A and 20B are notified that the jobs have been added to the individual queues (printing process start instruction and RIP process start instruction, step b5 in FIG. 4 and step c5 in FIG. 5). The inner state of the job management module 10 at this time (the states of the RIP queue 12, print queue 14, currently processing RIP information 18, and job-being-processed list 16) is as follows. Regarding the positions of jobs in each queue, a job on the left side has a higher order.

RIP queue: A2
Print queue: A1, B1
Currently processing RIP: none
Job-being-processed list: empty (2) The job A1 is input first, and thus the job management module 10 instructs the RIP 20A to start a printing process. The RIP 20A receives the instruction, and inquires of the job management module 10 a job to be printed. There is no currently processing RIP, and the RIP specified for the job at the top of the print queue 14 is the RIP 20A. Thus, a process of transferring (printing) a raster image of the job A1 is started in process (c). Accordingly, the RIP 20A serves as the currently processing RIP, and the job A1 is added to the job-being-processed list 16. The inner state of the job management module 10 at this time is as follows.

RIP queue: A2
Print queue: A1, B1
Currently processing RIP: RIP 20A
Job-being-processed list: A1

(3) Upon the job A2 being input immediately after the job A1, the job management module 10 instructs the RIP 20A to start a RIP process. Accordingly, the RIP 20A inquires of the job management module 10 a job to be RIP-processed. Here, the currently processing RIP is the RIP 20A, and the RIP specified for the job A2 at the top of the RIP queue 12 is the RIP 20A. Thus, the process for the job A2 is started in process (b). The job A2 is added to the job-being-processed list 16. The inner state of the job management module 10 at this time is as follows.

RIP queue: A2
Print queue: A1, B1
Currently processing RIP: RIP 20A
Job-being-processed list: A1, A2

(4) Upon the job B1 being input immediately after the job A2, the job management module 10 instructs the RIP 20B to start a printing process. Accordingly, the RIP 20B inquires of the job management module 10 a job to be printed. At this time, the currently processing RIP is the RIP 20A, and the RIP specified for the job at the top of the print queue 14 is the RIP 20A. Thus, the determination result in step c1 in process (c) in FIG. 5 is "NO", and a response indicating that there is no target job is transmitted to the RIP 20B. In accordance with this response, the RIP 20B shifts to a state of waiting for a printing process start instruction (step S202 in FIG. 9). Thus, no process is executed on the job B1 at this time. The inner state of the job management module 10 at this time is as follows.

RIP queue: A2
Print queue: A1, B1
Currently processing RIP: RIP 20A
Job-being-processed list: A1, A2

(5) Also, it is assumed that creation of a raster image of a first part of the job A2 is completed before printing of the job A1 is completed. In this case, the job A2 is added to the print queue 14. The job A2 is added to the position nearest to the top of the print queue 14 so as not to be positioned before the job in the job-being-processed list 16. That is, the job A2 is added to the position immediately after the job A1 (before the job B1). The inner state of the job management module 10 at this time is as follows.

RIP queue: A2
Print queue: A1, A2, B1
Currently processing RIP: RIP 20A
Job-being-processed list: A1, A2

(6) Subsequently, after the RIP process for all the pages of the job A2 has been completed before printing of the job A1 is completed, the job A2 is deleted from the RIP queue 12. The inner state of the job management module 10 at this time is as follows.

RIP queue: empty
Print queue: A1, A2, B1
Currently processing RIP: RIP 20A
Job-being-processed list: A1, A2

(7) Subsequently, after the printing of the job A1 has been completed, the job A1 is deleted from the print queue 14 and the job-being-processed list 16. Since the job A2 exists in the job-being-processed list 16, the currently processing RIP is still the RIP 20A (process (e)). The inner state of the job management module 10 at this time is as follows.

RIP queue: empty
Print queue: A2, B1
Currently processing RIP: RIP 20A
Job-being-processed list: A2

(8) Subsequently, since the print queue 14 is not empty, the RIP 20A inquires of the job management module 10 a job to be printed (YES in step S210 and proceeds to step S204 in FIG. 9). In this case, the currently processing RIP is the RIP 20A, and the RIP 20A is specified for the job at the top of the print queue 14. Thus, a process for the job A2 is started in process (c). The inner state of the job management module 10 at this time is as follows.

RIP queue: empty
Print queue: A2, B1
Currently processing RIP: RIP 20A
Job-being-processed list: A2

Figure 7:
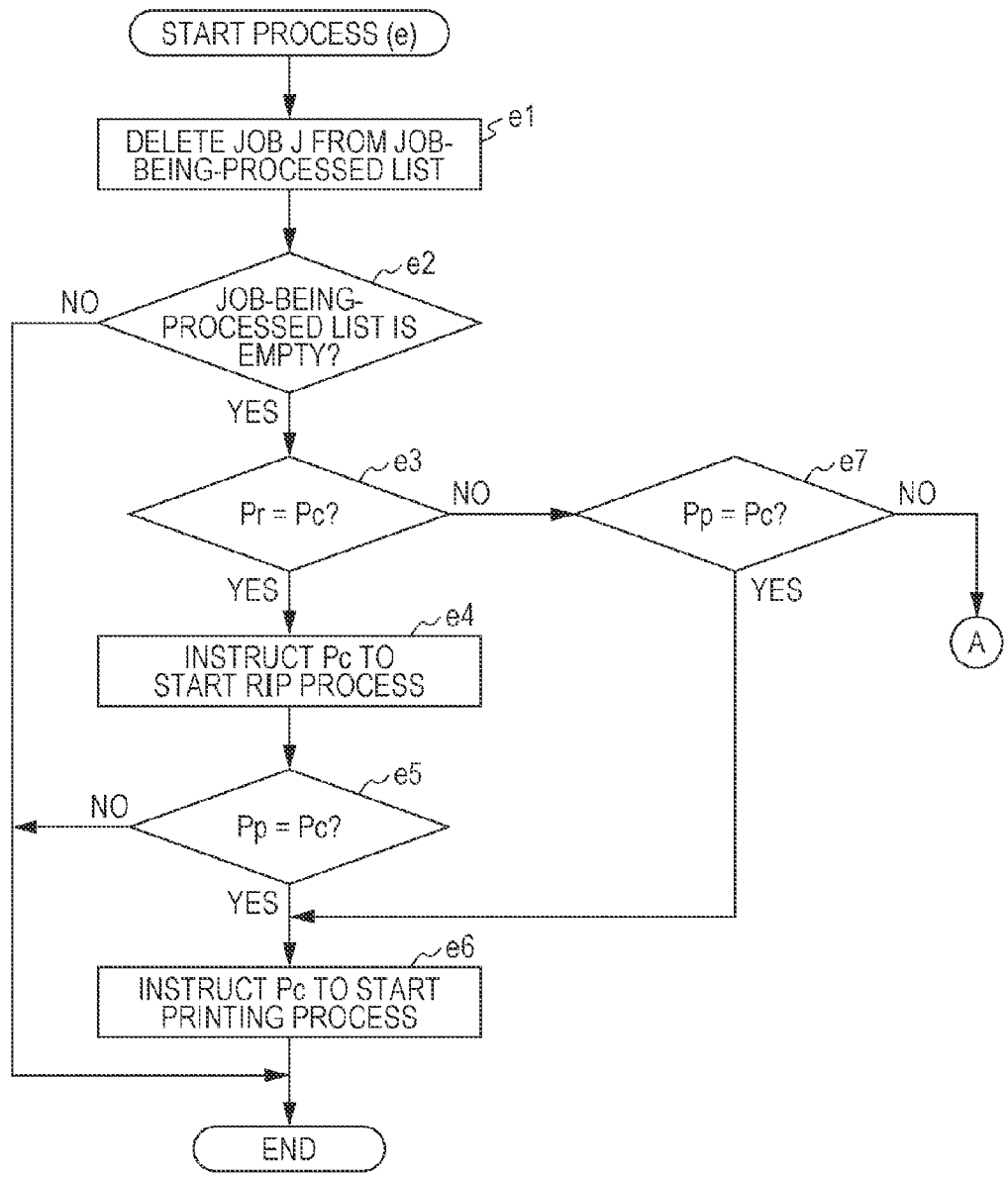
FIG. 7 is a diagram illustrating an example of the first half of a procedure of process (e) executed by the job management module.

(9) Subsequently, after the printing of the job A2 has been completed, the job A2 is deleted from the print queue 14 and the job-being-processed list 16. As a result, the job-being-processed list 16 becomes empty, and the job B1 is at the top of the print queue 14. The RIP queue 12 is already empty. The RIP 20A, which is the currently processing RIP, matches neither of the RIP specified for the job at the top of the RIP queue (not exist) and the RIP 20B specified for the job B1 at the top of the print queue 14 (both the determination results in steps e3 and e7 in FIG. 7 are "NO"). Since there is a job in the print queue 14 (the determination result in step e12 in FIG. 8 is "YES"), the currently processing RIP is "none" (substitute P0 for Pc in step e13), and a printing process start instruction is provided to the RIP 20B (step e14). The inner state of the job management module 10 at this time is as follows.

RIP queue: empty
Print queue: B1
Currently processing RIP: none
Job-being-processed list: empty

(10) The RIP 20B receives the printing process start instruction, and inquires of the job management module 10 a job to be printed. The currently processing RIP is "none", and the RIP specified for the job at the top of the print queue 14 is the RIP 20B, which has issued the query, and thus the RIP 20B servers as the currently processing RIP (step c3) and the job B1 is added to the job-being-processed list (step c4) in process (c). Then, the job management module 10 notifies the RIP 20B of the job B1 at the top of the print queue 14 (step c5). Accordingly, a printing process of the job B1 is started. The inner state of the job management module 10 at this time is as follows.

RIP queue: empty
Print queue: B1
Currently processing RIP: RIP 20B
Job-being-processed list: B1

(11) After the printing process of the job B1 has been completed, the job B1 is deleted from the print queue 14 and the job-being-processed list 16. As a result, the print queue 14 and the job-being-processed list 16 become empty. The RIP queue 12 is already empty. Thus, all the determination results in steps e3, e7, e8, and e12 in process (e) illustrated in FIGS. 7 and 8 are "NO", the currently processing RIP is changed to "none" (step e15), and the process ends. The inner state of the job management module 10 at this time is as follows.

RIP queue: empty
Print queue: empty
Currently processing RIP: none
Job-being-processed list: empty As described in the foregoing second example, in the system according to the exemplary embodiment, a RIP-unprocessed job is positioned before a RIP-processed job when being input. If the currently processing RIP at the time of input matches the RIP specified for the RIP-unprocessed job, the RIP-unprocessed job is printed before the RIP-processed job. Accordingly, the order of the jobs at the input is maintained.

Third Example

Next, a third example will be described. In the third example, it is assumed that three jobs A1, B1, and A2 are input in this order almost simultaneously when the print processing system is in an idle state.

A1: RIP-processed job specified to be processed by the RIP 20A
B1: RIP-processed job specified to be processed by the RIP 20B
A2: RIP-unprocessed job specified to be processed by the RIP 20A Here, it is assumed that the timing of completion of the RIP process for the job A2 is after insertion of the job B1 into the print queue 14 and before completion of printing of the job A1.

In this example, the job A1 is input first, and thus the RIP 20A serves as a currently processing RIP. At the time when the job A2 is input, a printing process for the job A1 is being executed, and the RIP 20A still serves as the currently processing RIP. Thus, the job A2 undergoes a RIP process executed by the raster image creating unit 22A of the RIP 20A. That is, at this time, the raster image creating unit 22A and the raster image transferring unit 24A are processing the different jobs A2 and A1 in parallel.

At the time when the RIP process for the job A2 is completed, the printing process for the job A1 is being executed. Thus, the RIP 20A still serves as the currently processing RIP, and there are the job A1 and the job B1 in this order in the print queue 14. Thus, at this time, the job A2 is inserted to the position after the job A1 and before the job B1 in the print queue 14 in process (d). After the printing process for the job A1 has been completed, the next job in the print queue 14, that is, the job A2, is printed. After the job A2 has been printed, the job B1 is printed.

In this example, the job processing order is different from the job input order. However, the first stage (raster image creating unit 22A) and the second stage (raster image transferring unit 24A) of the same RIP 20A process different jobs in parallel, and thereby the RIP 20A may be effectively used. Also, with the job A2 being inserted to the position before the job B1 in the print queue 14, overhead of a process caused by frequent change of a currently processing RIP may be reduced.

As may be understood from the description given above, in the control process according to the exemplary embodiment, each of different RIPs exclusively executes a process. That is, although the raster image creating units 22A and 22B and the raster image transferring units 24A and 24B are activated in all the RIPs, only one of the RIPs executes substantial processes of creating a raster image (step S108) and transferring a raster image (step S208), that is, processes using a memory region for holding a raster image.

In the exemplary embodiment, the raster image creating unit 22 and the raster image transferring unit 24 of the RIP (20A or 20B) that is exclusively executing a process operate in parallel. For example, when the RIP 20A is executing a process, the raster image creating unit 22A and the raster image transferring unit 24A operate in parallel. In such a parallel operation, the raster image creating unit 22A and the raster image transferring unit 24A may simultaneously process different jobs in parallel. Also, the raster image transferring unit 24A may transfer a raster image of a first part of a job, while the raster image creating unit 22A may create a raster image of the latter part of the job. In any case, in a currently processing RIP, the raster image creating unit 22A and the raster image transferring unit 24A continue to execute a process in a pipeline operation as long as there is a job to be processed. In this method, the usage efficiency of the raster image creating unit and the raster image transferring unit in the RIP is higher than in the method for executing creation and transfer of a raster image on one job after another. The same applies to a parallel operation by the raster image creating unit 22B and the raster image transferring unit 24B when the RIP 20B is executing a process.

In the control process according to the exemplary embodiment, a currently processing RIP is not changed while jobs for which the currently processing RIP is specified are being input, and these jobs are processed before an already input job for which another RIP is specified. Accordingly, overhead of a process caused by frequent change of a currently processing RIP may be reduced.

In the control process according to the exemplary embodiment, a RIP-unprocessed job for which a RIP process by a RIP starts first is printed before a RIP-processed job which is input after the RIP-unprocessed job and for which a different RIP is specified.

The above-described print processing system, except the part of the printer 30, may be realized by causing a general-purpose computer to execute a program representing the processes of the above-described functional modules, for example. Here, the computer has a hardware circuit configuration in which a microprocessor such as a central processing unit (CPU), a memory (first storage) such as a random access memory (RAM) and a read only memory (ROM), a hard disk drive (HDD) controller that controls an HDD, various input/output (I/O) interfaces, a network interface that performs control to establish connection with a network, such as a local area network (LAN), and so forth are connected to one another via a bus or the like. Also, a disc drive for reading data from and/or writing data on a portable disc recording medium, such as a compact disc (CD) or a digital versatile disc (DVD), or a memory reader/writer for reading data from and/or writing data on a portable nonvolatile recording medium of various standards, such as a flash memory, or the like may be connected to the bus via the I/O interface. The program describing the processes of the above-described functional modules is stored in a fixed storage device, such as a hard disk drive, via a recording medium such as a CD or DVD or via a communication medium such as a network, and is installed into the computer. The program stored in the fixed storage device is read out to the RAM and is executed by the microprocessor such as a CPU, and thereby the above-described functional modules are realized. Some or all of the functional modules may be configured as a hardware circuit, such as a dedicated large scale integration (LSI), an application specific integrated circuit (ASIC), or a field programmable gate array (FPGA).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a plurality of page description language processing units each corresponding to one of different page description languages; and
a job management unit that performs management to select one of the plurality of page description language processing units, the selected page description language processing unit serving as a currently processing page description language processing unit, and to cause only the currently processing page description language processing unit to process a print job,
each of the plurality of page description language processing units including
a raster image creating unit that interprets a print job described in one of the page description languages corresponding to the page description language processing unit and that creates a raster image, and
a raster image transferring unit that transfers the raster image created by the raster image creating unit to a printer so that the raster image is printed by the printer,
the job management unit including
a first queue that serves as a queue for a print job for which a raster image has not been created,
a second queue that serves as a queue for a print job for which a raster image has been created,
a reception-time adding unit that, upon receiving a printing execution instruction including a print job and specification information specifying one of the plurality of page description language processing units that is to process the print job, adds the print job to an end of the first queue in association with the specification information and instructs the raster image creating unit of the page description language processing unit specified by the specification information to start processing if a raster image of the print job has not been created, and that adds the print job to an end of the second queue in association with the specification information and instructs the raster image transferring unit of the page description language processing unit specified by the specification information to start processing if the raster image of the print job has been created,
an image-creation-time adding unit that, upon a raster image of a print job being created by the raster image creating unit of the currently processing page description language processing unit, adds the print job to the second queue and instructs the raster image transferring unit of the currently processing page description language processing unit to start processing,
a first instruction unit that, if both the page description language processing unit specified by the specification information associated with a print job at the top of the first queue and the page description language processing unit specified by the specification information associated with a print job at the top of the second queue do not match the currently processing page description language processing unit in a state where both the raster image creating unit and the raster image transferring unit of the currently processing page description language processing unit are not processing a print job, selects the page description language processing unit specified by the specification information associated with the print job at the top of the first queue or the second queue, the selected page description language processing unit serving as a new currently processing page description language processing unit, and that instructs the new currently processing page description language processing unit to start processing,
a second instruction unit that, if the page description language processing unit specified by the specification information associated with the print job at the top of the first queue matches the currently processing page description language processing unit in a state where both the raster image creating unit and the raster image transferring unit of the currently processing page description language processing unit are not processing a print job, selects the page description language processing unit specified by the specification information, the selected page description language processing unit continuing to serve as the currently processing page description language processing unit, and that instructs the raster image creating unit of the currently processing page description language processing unit to start processing,
a third instruction unit that, if the page description language processing unit specified by the specification information associated with the print job at the top of the second queue matches the currently processing page description language processing unit in a state where both the raster image creating unit and the raster image transferring unit of the currently processing page description language processing unit are not processing a print job, selects the page description language processing unit specified by the specification information, the selected page description language processing unit continuing to serve as the currently processing page description language processing unit, and that instructs the raster image transferring unit of the currently processing page description language processing unit to start processing,
a controller that performs control of examining the specification information associated with the print job at the top of the first queue every time the raster image creating unit finishes processing a print job, causing the raster image creating unit to process the print job at the top of the first queue if the page description language processing unit specified by the specification information matches a current currently processing page description language processing unit, examining the specification information associated with the print job at the top of the second queue every time the raster image transferring unit finishes processing a print job, and causing the raster image transferring unit to process the print job at the top of the second queue if the page description language processing unit specified by the specification information matches a current currently processing page description language processing unit, and a job-being-processed list memory that stores a list of one or more print jobs that are being processed by the raster image creating unit or the raster image transferring unit of the currently processing page description language processing unit and that have not yet been printed by the printer, wherein the image-creation-time adding unit adds the print job to the second queue by inserting the print job between a first print job that is not stored in the job-being-processed list memory with respect to the print job at the top of the second queue, and a print job immediately before the first print job.

2. An image processing method comprising:

performing management to select one of a plurality of page description language processing units each corresponding to one of different page description languages, the selected page description language processing unit serving as a currently processing page description language processing unit, and to cause only the currently processing page description language processing unit to process a print job;

interpreting a print job described in one of the page description languages corresponding to one of the plurality of page description language processing units and creating a raster image;

transferring the created raster image to a printer so that the raster image is printed by the printer;

upon receiving a printing execution instruction including a print job and specification information specifying one of the plurality of page description language processing units that is to process the print job, adding the print job to an end of a first queue in association with the specification information and instructing a raster image creating unit of the page description language processing unit specified by the specification information to start processing if a raster image of the print job has not been created, the first queue serving as a queue for a print job for which a raster image has not been created, and adding the print job to an end of a second queue in association with the specification information and instructing a raster image transferring unit of the page description language processing unit specified by the specification information to start processing if the raster image of the print job has been created, the second queue serving as a queue for a print job for which a raster image has been created;

upon a raster image of a print job being created by a raster image creating unit of the currently processing page description language processing unit, adding the print job to the second queue and instructing a raster image transferring unit of the currently processing page description language processing unit to start processing;

if both the page description language processing unit specified by the specification information associated with a print job at the top of the first queue and the page description language processing unit specified by the specification information associated with a print job at the top of the second queue do not match the currently processing page description language processing unit in a state where both the raster image creating unit and the raster image transferring unit of the currently processing page description language processing unit are not processing a print job, selecting the page description language processing unit specified by the specification information associated with the print job at the top of the first queue or the second queue, the selected page description language processing unit serving as a new currently processing page description language processing unit, and instructing the new currently processing page description language processing unit to start processing;

if the page description language processing unit specified by the specification information associated with the print job at the top of the first queue matches the currently processing page description language processing unit in a state where both the raster image creating unit and the raster image transferring unit of the currently processing page description language processing unit are not processing a print job, selecting the page description language processing unit specified by the specification information, the selected page description language processing unit continuing to serve as the currently processing page description language processing unit, and instructing the raster image creating unit of the currently processing page description language processing unit to start processing;

if the page description language processing unit specified by the specification information associated with the print job at the top of the second queue matches the currently processing page description language processing unit in a state where both the raster image creating unit and the raster image transferring unit of the currently processing page description language processing unit are not processing a print job, selecting the page description language processing unit specified by the specification information, the selected page description language processing unit continuing to serve as the currently processing page description language processing unit, and instructing the raster image transferring unit of the currently processing page description language processing unit to start processing;

performing control of examining the specification information associated with the print job at the top of the first queue every time the raster image creating unit finishes processing a print job, causing the raster image creating unit to process the print job at the top of the first queue if the page description language processing unit specified by the specification information matches a current currently processing page description language processing unit, examining the specification information associated with the print job at the top of the second queue every time the raster image transferring unit finishes processing a print job, and causing the raster image transferring unit to process the print job at the top of the second queue if the page description language processing unit specified by the specification information matches a current currently processing page description language processing unit; and storing a list of one or more print jobs that are being processed by the raster image creating unit or the raster image transferring unit of the currently processing page description language processing unit and that have not yet been printed by the printer, wherein, in the adding upon a raster image of a print job being created, the print job is added to the second queue by being inserted between a first print job that is not stored with respect to the print job at the top of the second queue, and a print job immediately before the first print job.

3. A non-transitory computer readable medium storing a program causing a computer to execute a process, the process comprising: performing management to select one of a plurality of page description language processing units each corresponding to one of different page description languages, the selected page description language processing unit serving as a currently processing page description language processing unit, and to cause only the currently processing page description language processing unit to process a print job; interpreting a print job described in one of the page description languages corresponding to one of the plurality of page description language processing units and creating a raster image; transferring the created raster image to a printer so that the raster image is printed by the printer; upon receiving a printing execution instruction including a print job and specification information specifying one of the plurality of page description language processing units that is to process the print job, adding the print job to an end of a first queue in association with the specification information and instructing a raster image creating unit of the page description language processing unit specified by the specification information to start processing if a raster image of the print job has not been created, the first queue serving as a queue for a print job for which a raster image has not been created, and adding the print job to an end of a second queue in association with the specification information and instructing a raster image transferring unit of the page description language processing unit specified by the specification information to start processing if the raster image of the print job has been created, the second queue serving as a queue for a print job for which a raster image has been created; upon a raster image of a print job being created by a raster image creating unit of the currently processing page description language processing unit, adding the print job to the second queue and instructing a raster image transferring unit of the currently processing page description language processing unit to start processing; if both the page description language processing unit specified by the specification information associated with a print job at the top of the first queue and the page description language processing unit specified by the specification information associated with a print job at the top of the second queue do not match the currently processing page description language processing unit in a state where both the raster image creating unit and the raster image transferring unit of the currently processing page description language processing unit are not processing a print job, selecting the page description language processing unit specified by the specification information associated with the print job at the top of the first queue or the second queue, the selected page description language processing unit serving as a new currently processing page description language processing unit, and instructing the new currently processing page description language processing unit to start processing; if the page description language processing unit specified by the specification information associated with the print job at the top of the first queue matches the currently processing page description language processing unit in a state where both the raster image creating unit and the raster image transferring unit of the currently processing page description language processing unit are not processing a print job, selecting the page description language processing unit specified by the specification information, the selected page description language processing unit continuing to serve as the currently processing page description language processing unit, and instructing the raster image creating unit of the currently processing page description language processing unit to start processing; if the page description language processing unit specified by the specification information associated with the print job at the top of the second queue matches the currently processing page description language processing unit in a state where both the raster image creating unit and the raster image transferring unit of the currently processing page description language processing unit are not processing a print job, selecting the page description language processing unit specified by the specification information, the selected page description language processing unit continuing to serve as the currently processing page description language processing unit, and instructing the raster image transferring unit of the currently processing page description language processing unit to start processing; performing control of examining the specification information associated with the print job at the top of the first queue every time the raster image creating unit finishes processing a print job, causing the raster image creating unit to process the print job at the top of the first queue if the page description language processing unit specified by the specification information matches a current currently processing page description language processing unit, examining the specification information associated with the print job at the top of the second queue every time the raster image transferring unit finishes processing a print job, and causing the raster image transferring unit to process the print job at the top of the second queue if the page description language processing unit specified by the specification information matches a current currently processing page description language processing unit; and storing a list of one or more print jobs that are being processed by the raster image creating unit or the raster image transferring unit of the currently processing page description language processing unit and that have not yet been printed by the printer, wherein, in the adding upon a raster image of a print job being created, the print job is added to the second queue by being inserted between a first print job that is not stored with respect to the print job at the top of the second queue, and a print job immediately before the first print job.

* * * * *